United States Patent
Henn et al.

(10) Patent No.: US 6,600,487 B1
(45) Date of Patent: Jul. 29, 2003

(54) METHOD AND APPARATUS FOR REPRESENTING, MANIPULATING AND RENDERING SOLID SHAPES USING VOLUMETRIC PRIMITIVES

(75) Inventors: Christian Henn, Colombier (CH); Robert Grzeszczuk, Menlo Park, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/338,356

(22) Filed: Jun. 22, 1999

Related U.S. Application Data

(60) Provisional application No. 60/093,848, filed on Jul. 22, 1998.

(51) Int. Cl.⁷ .............................................. G06T 15/00
(52) U.S. Cl. ..................................................... 345/423
(58) Field of Search ................................. 345/419, 423, 345/420, 421, 422, 424, 619, 620

(56) References Cited

U.S. PATENT DOCUMENTS 5,553,206 A * 9/1996 Meshkat ...................... 395/123
6,262,737 B1 * 7/2001 Li et al. ...................... 345/419

* cited by examiner

Primary Examiner—Phu K. Nguyen
(74) Attorney, Agent, or Firm—Squire, Sanders & Dempsey, L.L.P.

(57) ABSTRACT

A method and apparatus for modeling three-dimensional solid objects are provided. The method of the present invention uses the concept of volumetric objects. Each volumetric object is a decoupled combination of volumetric geometry and volumetric appearance. To be rendered, one or more volumetric objects are tessellated into a series of one or more volumetric primitives. The volumetric primitives are then polygonized. The result is a list of two-dimensional polygons. The list of polygons is then depth sorted, colored, shaded and texture-mapped with the voxel data that forms the basis for the volumetric object. The polygons are composited together in the frame buffer, or other device, to form the final displayable image.

19 Claims, 6 Drawing Sheets

300

400

500b
500a
500c
500e
500d pyramids:

pyramid pyramid strip tetrahedra:

tetrahedron tetrahedron face strip tetrahedron edge strip prisms:

prism prism face strip prism base strip prism edge strip hexahedra:

hexahedron hexahedron strip

METHOD AND APPARATUS FOR REPRESENTING, MANIPULATING AND RENDERING SOLID SHAPES USING VOLUMETRIC PRIMITIVES

RELATED APPLICATIONS

The following application claims the benefit of U.S. Provisional Application Serial No. 60/093,848 entitled "Method and Apparatus for Volume Imaging Primitives" by Christian Henn, filed Jul. 22, 1998, the disclosure of which is incorporated in this document by reference.

FIELD OF THE INVENTION

The present invention relates generally to systems for computer graphics. More specifically, the present invention includes a method and apparatus for rendering three-dimensional volumes for visualization in scientific, medical and other environments.

BACKGROUND OF THE INVENTION

Computer systems typically create three-dimensional images using a mosaic-like approach where each three-dimensional object is drawn as a mesh of two-dimensional polygons. These two-dimensional polygons, or surface primitives, are transformed in collections of pixels using a process known as rasterization. The rasterized pixels can then be displayed on an output device such as a video monitor.

For many applications, meshes of two-dimensional geometric primitives are an effective method for modeling three-dimensional objects. This is partially due to the fact that many graphics systems include specialized hardware for rasterizing two-dimensional geometric primitives. This hardware allows these systems to rapidly rasterize and display the two-dimensional primitives used to model three-dimensional objects.

The surface approach is especially effective in cases where the inside of a three-dimensional object does not influence its outer appearance. Solid, nontranslucent objects are examples of objects of this type. These objects may be accurately modeled as meshes of surface polygons. In many other cases, however, the interiors of three-dimensional objects are important to their appearances. Translucent objects like jelly, marbles and clouds are examples of cases where the inside of an object contributes to its overall appearance. The internal structure of these objects makes them difficult to display using traditional two-dimensional polygon meshes.

Abstract data sets, such as those produced by medical, seismological or microscopic equipment, are another area where traditional two-dimensional methods are difficult to apply. Data sets of this type are often best viewed as translucent three-dimensional objects. This is why such objects are difficult to display as two-dimensional polygon meshes.

For this reason, a need exists for a method for modeling three-dimensional objects. This need is particularly important for applications that display translucent three-dimensional objects. It is also important for applications that display abstract data sets including medical, seismological, microscopic and other scientific data sets, such as fluid flow data sets.

SUMMARY OF THE INVENTION

The present invention includes a method and apparatus for modeling three-dimensional objects. The method of the present invention uses the concept of volumetric objects. Volumetric objects are, in some ways, analogous to the surface-based objects that are typically used to create computer generated images. Each volumetric object is defined as a combination of volumetric appearance and volumetric geometry. The term volumetric appearance refers to the visual appearance of the points included in a volumetric object. Volumetric appearance may be defined using any technique that maps visual attributes to voxels. Examples of these techniques include texture mapping, per-vertex coloring and shading, translucency, transparency and fog techniques. In many cases, a volumetric object's volumetric appearance will correspond to a real or generated data set. As an example, a volumetric appearance may be all of part of the data collected for a magnetic resonance image (MRI). The term volumetric geometry refers to the three-dimensional shape of the volumetric object.

The two attributes (volumetric geometry and volumetric appearance) are decoupled. This means that volumetric geometry may be changed independently of volumetric appearance. As a result, the same volumetric appearance may be used to create an endless range of different volumetric objects each having a differently sized or shaped volumetric geometry. The volumetric appearance for a volumetric object is mapped onto the volumetric object as part of the rendering process.

Prior to the rendering process, each volumetric object is constructed as a tessellated series of one or more volumetric primitives. Each volumetric primitive is a three-dimensional object. Typically, these three-dimensional objects will be polyhedra such as tetrahedra. Other solids may be used, however, including solids such as spheres or ellipsoids and other analytic solid shapes.

Rendering of volumetric objects may be performed using a range of different techniques. In most cases, it makes sense to choose a technique that is supported by the underlying graphics environment. Many of these environments are optimized for the rendering of polygons. For these environments, it will generally be preferable to render volumetric objects in three stages: polygonization, depth-sorting, and compositing.

During the first of these stages, polygonization, each volumetric primitive in the volumetric object is sampled with a series of sampling surfaces. The sampling surfaces may be parallel or concentric. More generally, any nonintersecting distribution of surfaces may be used. Each intersection between a sampling surface and its volumetric primitive is converted into an edge list, which can be tesselated into one or more polygons, often triangles. The result is a list of polygons, which are planar in most cases. Appearance parameters are interpolated accordingly. The list of polygons is then handed back to the application process that is rendering the volumetric object. This application may then perform further processing of the polygons or their appearances, or mix the polygons with other types of primitives including zero, one or two-dimensional primitives (i.e. points, lines and surfaces).

During the second stage, depth-sorting, the list of polygons is sorted back-to-front or front-to-back, depending on the treatment of its appearance. This ensures that proper transparency of overlapping polygons will be maintained during the rendering process. In particular, this accounts for attenuation or filtering effects between adjacent polygons. In other cases, the appearance of a volumetric primitive is defined as a simple summation of its included polygons. In these cases, the depth sorting stage is unnecessary and may be omitted.

During the final stage, compositing, volumetric appearance is mapped onto polygons. The mapping may be accomplished using any technique that maps visual attributes to voxels. Examples of these techniques include texture mapping, per-vertex coloring and shading, translucency, transparency and fog techniques. The polygons are composited together in the frame buffer, or other device, to form the final displayable image.

In this way, volumetric objects provide a convenient and powerful method for modeling three-dimensional solid objects. This method is especially attractive because it does not depend on specialized hardware or software environments. Instead, by constructing volumetric objects using volumetric primitives and, ultimately, decomposing those volumetric primitives into aligned sets of polygons, the present invention provides a method that is adaptable to traditional graphics pipelines.

In other environments, volumetric objects can be rendered using other techniques such as ray casting, shear warp, or volume splatting or any other rasterization technique. These techniques may be more suitable when they are supported by the underlying graphics environment.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Environment

Figure 1:
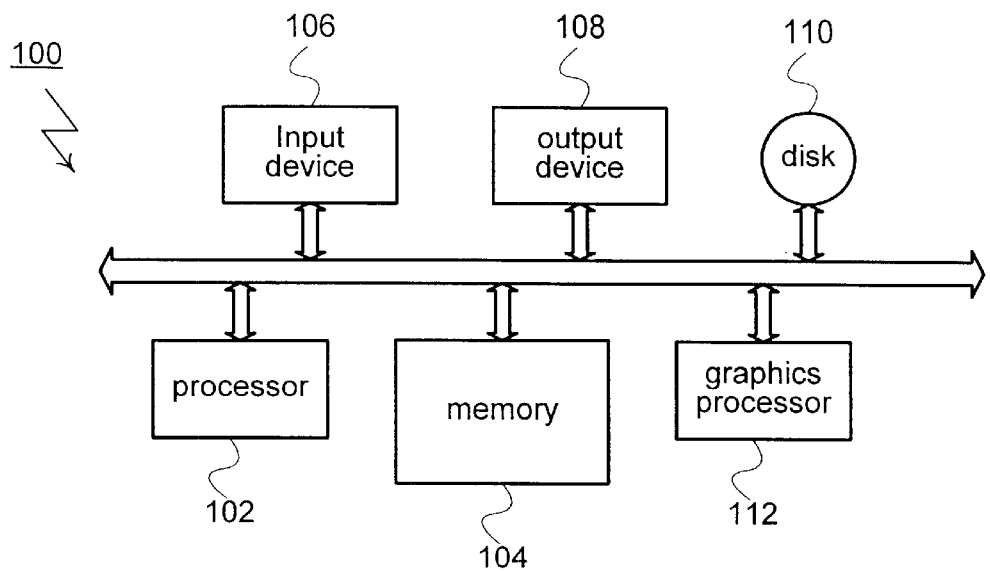
FIG. 1 is a block diagram of a generic computer system shown as a representative environment for the present invention.

In FIG. 1, a computer system 100 is shown as a representative environment for the present invention. Structurally, computer system 100 includes a host processor, or host processors 102, and a memory 104. An input device 106 and an output device 108 are connected to host processor 102 and memory 104. Input device 106 and output device 108 represent a wide range of varying I/O devices such as disk drives, keyboards, modems, network adapters, printers and displays. Each node 102 may also includes a disk drive 110 of any suitable disk drive type (equivalently, disk drive 110 may be any non-volatile mass storage system such as "flash" memory). Computer system 100 also preferably includes a graphics processor 112 of any suitable type. Graphics processor 112 implements all of the tasks required to translate graphics primitives and. attributes to displayable output. In FIG. 1, host processor 102 and graphics processor 112 are interconnected using a bus. It should be appreciated that the present invention is equally suitable to environments where host processor 102 and graphics processor 112 share a commonly addressable memory.

Figure 2:
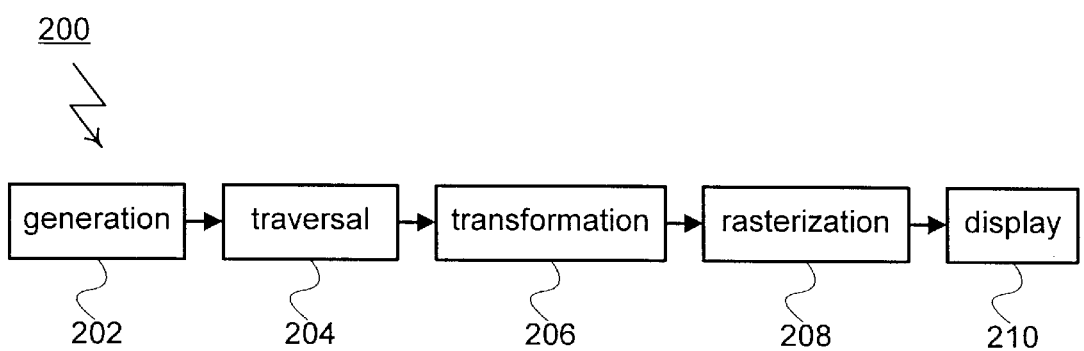
FIG. 2 is a block diagram of a graphics pipeline as used by an embodiment of the present invention.

Computer system 100 is the host for a graphics pipeline. An implementation for this pipeline is designated 200 in FIG. 2. Pipeline 200 includes generation stage 202, traversal stage 204, transformation stage 206, rasterization stage 208 and display stage 210. Generation stage 202 corresponds to the creation, acquisition, or modification of information to be displayed and organizing this information into application data structures. Traversal stage 204 corresponds to the of traversal of the application data structures generated in the preceding stage, passing on the appropriate graphics data. Transformation stage 206 corresponds to the transformation of the graphics data from object-space coordinates into screen-space coordinates, performing requested lighting operations, then clipping the transformed data in clip-space, and projecting the resulting coordinates into window-space. Rasterization stage 208 renders screen-space primitives (like points, lines, polygons and polyhedra) into a frame buffer. Per-vertex shading calculations, texture lookups and calculations, and per-pixel operations like depth testing are performed in this stage. Display stage 210 scans the resulting pixels in the frame buffer, typically to a display monitor.

Volumetric Rendering Method

Figure 3:
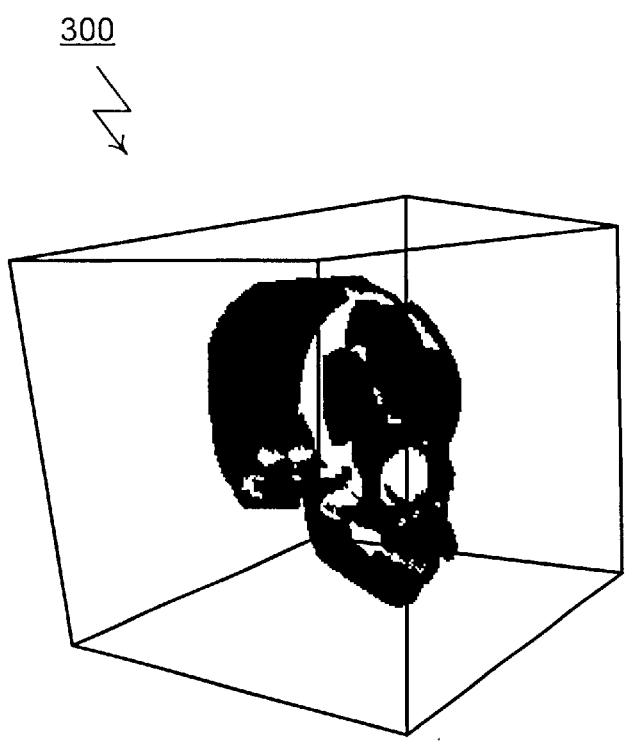
FIG. 3 is an orthogonal view of an exemplary volumetric object shown.

The present invention includes a method and apparatus for modeling three-dimensional objects. The method of the present invention uses the concept of volumetric objects. Volumetric objects are, in some ways, analogous to the point, line-or surface-based geometric objects that are typically used to create computer generated images. Each volumetric object is defined as a combination of volumetric appearance and volumetric geometry. Compositing may simulate natural light transport (e.g., blended transparency) or it may be an abstract operation (e.g., maximum intensity projection). The term volumetric appearance refers to the visual properties that forms the basis for the volumetric object. Appearance can be explicit, i.e. 1D, 2D, 3D or higher dimensional texture, or implicit, i.e. visual properties are interpolated from data values at the vertices of the primitive. Examples of appearance parameters are color, transparency normals, but also non graphical informatives, such as pressure, temperature, etc. The term volumetric geometry refers to the three-dimensional solid shape of the volumetric object, bound by one or more closed polygonal surfaces. As an example, FIG. 3 shows a representative volumetric object 300. Volumetric object 300 is a combination of volumetric appearance (in this case a collection of voxels that describe a human skull) and a volumetric geometry (a cube in this case).

The two attributes (volumetric geometry and volumetric appearance) are decoupled. This means that volumetric geometry may be changed independently of volumetric appearance. As a result, the same volumetric appearance may be used to create an endless range of different volumetric objects each having a differently sized or shaped volumetric geometry. It is possible, for example to elongate the cubic geometry of FIG. 3 to display volumetric object 300 in a distorted fashion. Similarly, by suitably defining the mapping between the appearance and geometry, it is possible to achieve more complex types of deformations: radial, tapering, free form, and others. The cubic geometry of FIG. 3 may also be altered to display only a portion of volumetric object 300, such as the mandible.

Before rendering, each volumetric object must be described or defined by a programmer or application program. Volumetric objects are defined using a tessellation approach where each volumetric object is built up from a collection of volumetric primitives. The volumetric primitives are three-dimensional shapes or polyhedrons. The programmer or application program defines a tessellation of 20 each volumetric object using these volumetric primitives. This can be seen in FIG. 4 where a cube-shaped volumetric object 400 is tessellated as a series of five tetrahedral volumetric primitives. The five individual tetrahedral volumetric primitives (500a through 500e) can be seen more clearly in FIG. 5.

Figure 4:
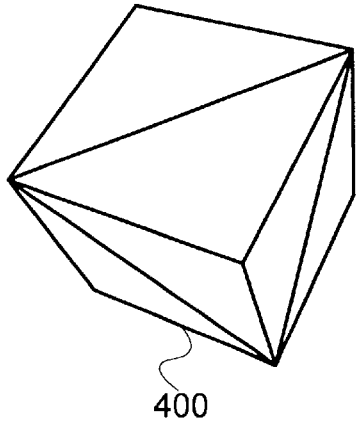
FIG. 4 is an orthogonal view of cubic volumetric geometry tessellated as a series of volumetric primitives.
Figure 5:
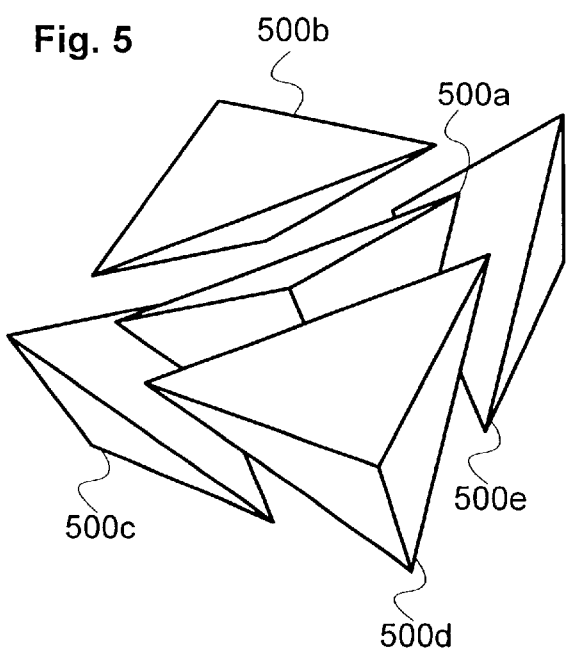
FIG. 5 is an exploded view showing the volumetric primitives of FIG. 4.
Figure 6:
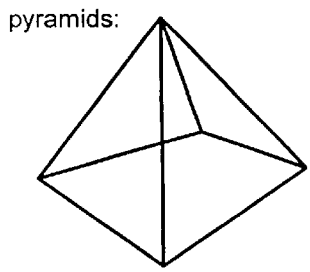
FIG. 6 shows tessellations using various types of volumetric primitives.
Figure 6:
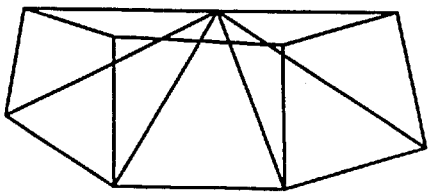
Figure 6:
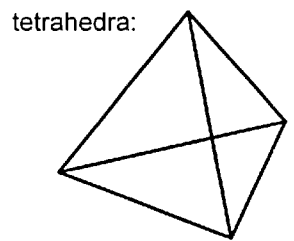
Figure 6:
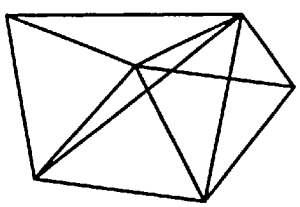
Figure 6:
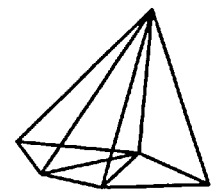
Figure 6:
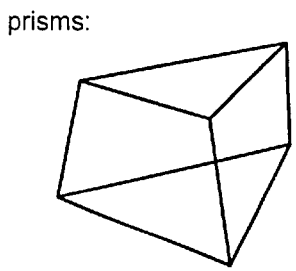
Figure 6:
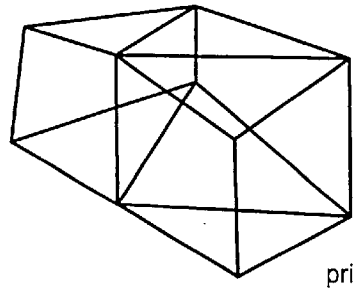
Figure 6:
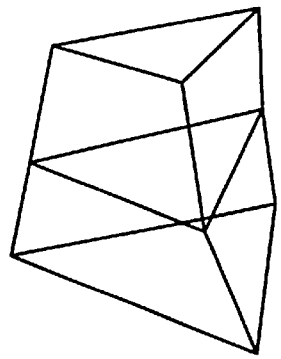
Figure 6:
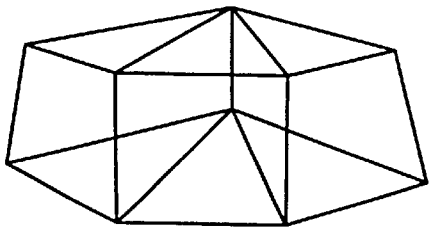
Figure 6:
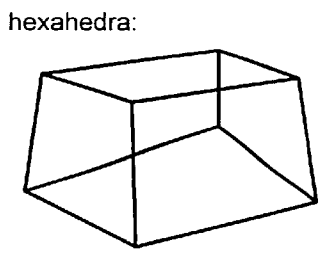
Figure 6:
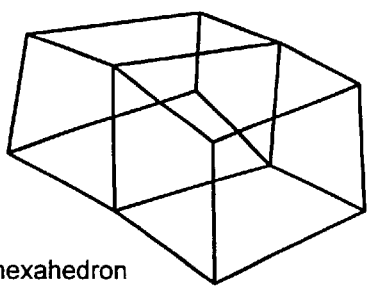

The use in FIGS. 4 and 5 of tetrahedral volumetric primitives is intended to be representative. Other types of polyhedra may be used and, in some cases, may be more appropriate. Some examples are, shown in FIG. 6 where tesselations using pyramids, tetrahedra, prisms, and hexahedra are shown.

Figure 7:
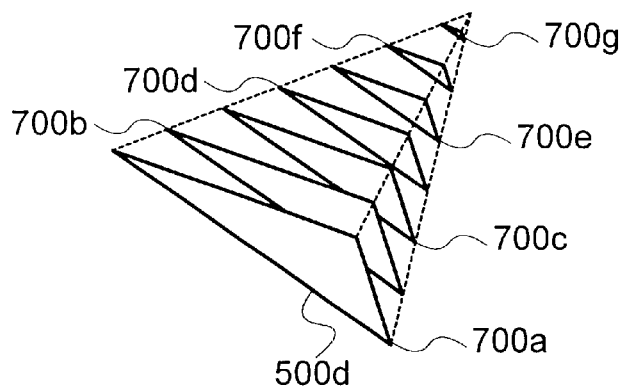
FIG. 7 is an orthogonal view showing polygonization of a volumetric primitive.

As part of the rendering process, each volumetric primitive is converted into a series of polygons. This process, known as polygonization, may be more easily understood by reference to FIG. 7. FIG. 7 shows volumetric primitive 500d after it has been polygonized into polygons 700a through 700g. Each of these polygons 700 is either a triangle or a quadrilateral polygon.

Figure 8:
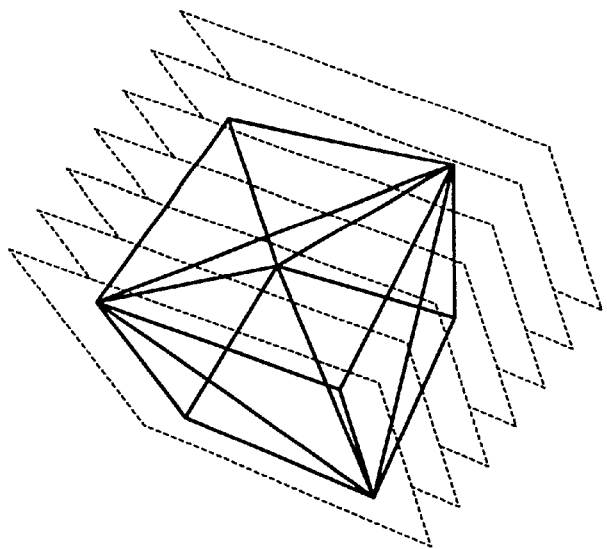
FIG. 8 is an orthogonal view showing the sampling planes used to perform the polygonization of FIG. 7.
Figure 8:
Figure 9A:
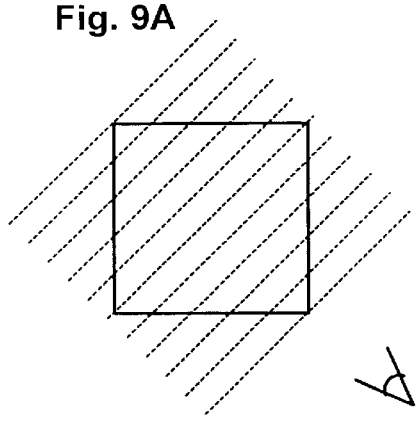
FIG. 9A shows a set of sampling surfaces aligned with the eye-point.
Figure 9B:
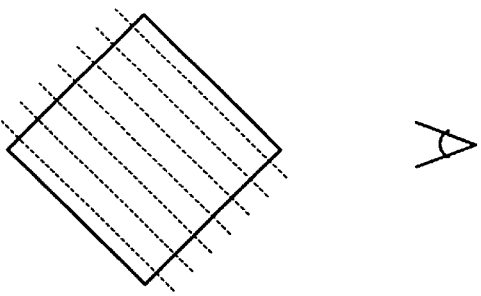
FIG. 9B shows a set of sampling surfaces aligned with the major axis of a volumetric primitive.

To perform the polygonization process, either the host processor 102 or the graphics processor 112 samples each volumetric primitive using a series of parallel or concentric surfaces. Other polygon alignments may be used as well, however, polygons may not penetrate or intersect each other. As an example, FIG. 8 shows the set of surfaces used to polygonize volumetric primitive 500d. The sampling surfaces may be oriented in a number of different ways. As shown in FIG. 9A, one of these ways is to orient the surfaces so that they are aligned orthogonal to the direction with the eye-point from which an image is viewed. A second way, shown in FIG. 9B is to orient the surfaces so that they are aligned with a major axis, or any alike axis, of a volumetric object or volumetric primitive being polygonized. In a similar fashion, the surfaces may also be aligned with a minor axis.

Figure 9C:
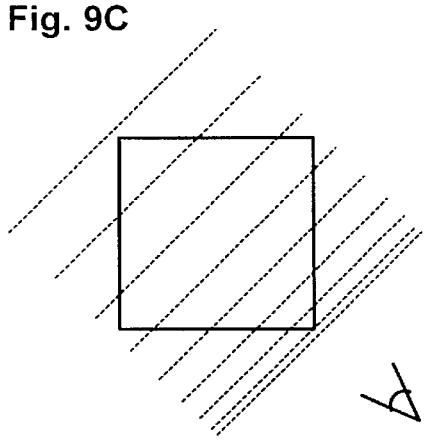
FIG. 9C shows a set of sampling surfaces spaced to enhance the nearest part of a volumetric primitive.

As shown in FIGS. 9A and 9B, the sampling surfaces may be distributed in an equal fashion. This produces an equal spacing between adjacent sampling surfaces. The sampling surfaces may also be distributed so that more surfaces are positioned at an important part of an volumetric object. This can be used, for example, to provide a greater level of detail for portions of a volumetric object that are near to the eye-point from which an image is viewed. This is shown, for example, in FIG. 9C.

Figure 9D:
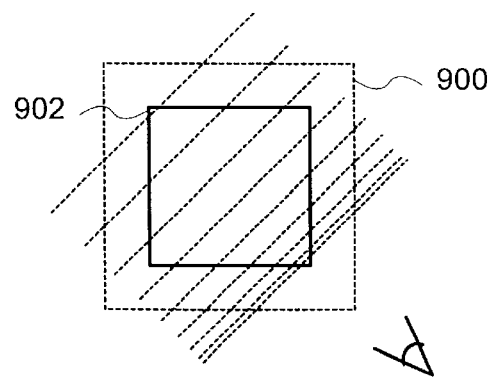
FIG. 9D shows a set of sampling surfaces positioned to exclude volumetric data not included in a volumetric primitive.

The volumetric primitives may also be distributed to avoid voxel data that is not included within volumetric objects being rendered. To illustrate, FIG. 9D uses outline 900 to symbolize a region that contains voxel data. Outline 900 surrounds a volumetric object 902 that is to be rendered. Volumetric object 902 has been polygonized using a series of sampling surfaces. These sampling surfaces are positioned so that they span volumetric object 902. Regions within outline 900 that are either nearer or farther than volumetric object 902 are not spanned. More sophisticated space leaping algorithms, such as polygon assisted ray casting (PARC), can be implemented by suitably modeling the reduced region of interest and rendering the resulting model with the basic technique.

Host processor 102 or graphics processor 112 clips the sampling surfaces to the boundaries of the volumetric primitives that that are being polygonized. The result is a list of two-dimensional polygons represented as triangular or quadrilateral geometric primitives. The list of primitives is then handed back to the application process that is performing the rendering process. This allows the application process to treat the list of primitives in the same way as it treats other graphics primitives. Thus, during object definition, transformations may also be applied to the volumetric primitive vertices. The two-dimensional primitives on the list may be processed using normal three-dimensional rendering transformations. The primitives on the list may also be mixed with other graphics primitives, including the graphics primitives generated for other volumetric primitives.

Once the application program has completed all desired processing and transformations, the rendering process enters its next stage. During this stage, depth-sorting, the list of primitives is sorted back-to-front. This ensures that proper transparency of primitives, stacked in the viewing direction will be maintained during the rendering process.

The final stage of the volumetric rendering process is known as compositing. During the compositing stage, the graphics primitives are filled with the voxel data that forms the basis for the volumetric object (using, for example texture mapping or vertex based coloring). The primitives are composited together in a frame buffer, or other device, to form the final displayable image.

Improved Tessellation

Figure 10:
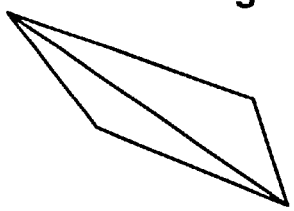
FIG. 10 shows two polygones produced by the polygonization of the volumetric object of FIG. 4.

The use of volumetric primitives to describe volumetric objects subdivides the rendering process. In effect, each volumetric object is rendered as a series of two-dimensional polygons each of which is separately rendered. In some cases, this may result in undesirable visual artifacts. To better understand artifacts of this nature, FIG. 10 shows two of the many polygons that will result if volumetric object 400 is polygonized (assuming the sampling surfaces shown in FIG. 8). The two polygons of FIG. 10 are triangles that share a common edge. In the described embodiment, these two polygons will be rendered separately. Depending on how colors are interpolated across the two triangles, this may produce a color mismatch at the edge shared between two polygons. Typically, this may result in a visual "banding" along edges between volumetric primitives.

For this reason, it is sometime desirable to tessellate volumetric objects using a larger number of more uniformly distributed volumetric primitives. For example, it is possible to tessellate cubes, such as volumetric object 400, using six pyramid shaped volumetric primitives. The apex of each pyramid would be positioned at the cube's center with the bases of each pyramid forming the cube's faces. These six pyramids can then be subdivided into four tetrahedra for a total of twenty-four volumetric primitives. Similar, non-minimal tessellations may be applied to other volumetric objects to reduce or eliminate artifacts of this nature.

Virtualizing Appearance or Voxel Memory

Practice has shown that the volumetric rendering method of the present invention is most efficient when deployed in environments that provide hardware support for three-dimensional texture mapping. Hardware support for three-dimensional texture allows the volumetric appearance of volumetric objects to be treated as a texture. During the compositing stage, the volumetric appearance is textured onto the volumetric primitives that have been generated for volumetric objects. For this reason, it is appropriate to refer to the area within graphics processor 112 where three-dimensional textures are stored as a volumetric memory or voxel cache.

The amount of volumetric memory provided by graphics processor 112 is necessarily limited. As a result, there are cases where the storage capacity required for volumetric data will exceed the amount of volumetric memory that is available. In these cases, volumetric data is subdivided into a series of bricks. Each brick represents a three-dimensional grid of voxel samples. The amount of memory required to store a brick is equal to, or less than, the amount of volumetric memory provided by graphics processor 112.

Figure 11:
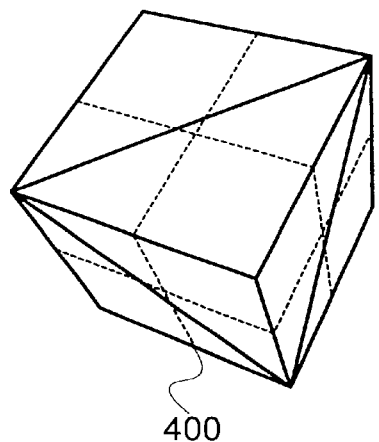
FIG. 11 shows the volumetric object of FIG. 4 subdivided into an eight brick set.

A group of adjacent bricks is known as a brick set. A particular volumetric appearance may contain one or more brick sets. As an example, FIG. 11 shows the cubic volumetric object 400 of FIG. 4 subdivided into a brick set of eight bricks. Brick sets form a type of virtual memory. The application program rendering volumetric objects controls the particular brick that is included in the volumetric memory of graphics processor 112.

Figure 12:
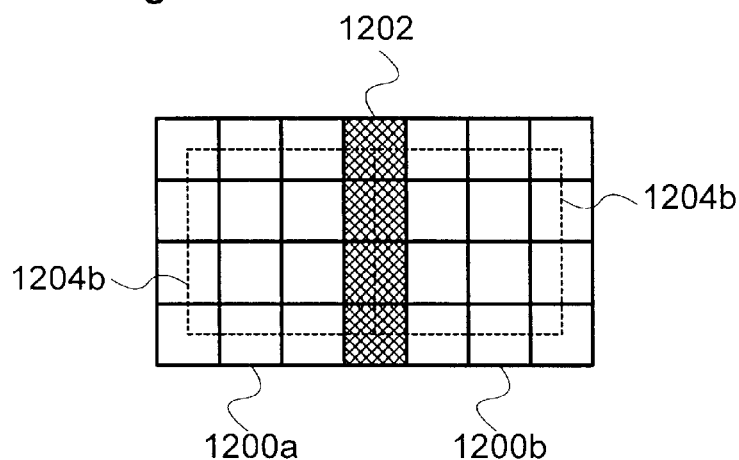
FIG. 12 is a block diagram showing the overlap between two adjacent bricks.

To reduce or eliminate the number of border-related interpolation artifacts created by bricking, it is preferable to include some amount of overlap between the bricks in a brick set. An example of this type of overlap is shown in FIG. 12 where bricks 1200a and 1200b are shown as adjacent four-by-four bricks. Bricks 1200a and 1200b share an overlapping region 1202 of four voxels. Bricks 1200a and 1200b also have respective clip boxes 1204a and 1204b. Clip boxes 1204 limit rendering of volumetric objects to the area encompassed by bricks 1200. At the same time, interpolation within these bricks may be performed using voxels that lie outside of bricks 1200. This ensures smooth transitions between adjacent bricks and eliminates or reduces undesirable visual artifacts.

The amount of overlap between adjacent bricks is preferably based on the type of interpolation employed during the rendering process. For example, in cases where tri-linear interpolation is used, the bricks in a set need to overlap by one voxel in each direction. If cubic interpolation is used, the overlap needs to be three voxels in each direction.

Volumetric Primitives API

The present invention includes an application programming interface (API) for volumetric rendering. This API is built on top of and is an extension of the OPENGL graphics environment (OPENGL is a registered trademark of Silicon Graphics, Inc.). This allows the volumetric rendering method to be used in any of the many environments where OPENGL is supported. The attached appendix describes the volumetric rendering API in detail.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for rendering a volumetric object, comprising: a pipeline of steps, including:

modeling a volumetric object as a disassociated appearance and geometry to thereby enable changing of the geometry of the volumetric object independently of the appearance of the volumetric object;

tessellating the geometry of the volumetric object into polyhedral primitives;

simplifying a resulting polyhedral mesh;

rasterizing and compositing each of the primitives for producing a rasterized image; and displaying the rasterized image.

2. A method as recited in claim 1 wherein the modeling step is decoupled from remaining steps which include the tessellating, simplifying, transforming, rasterizing and compositing, and displaying steps.

3. A method as recited in claim 1 wherein the appearance includes a color, a shading parameter, an opacity and a texture.

4. A method as recited in claim 1 wherein the appearance is bound to primitives on a per-primitive, per-vertex, or a per-fragment basis.

5. A method as recited in claim 1 further comprising the step of subdividing the volumetric appearance into a series of one or more overlapping hexahedral bricks.

6. A method as recited in claim 1 wherein polyhedra are tetrahedra.

7. A method as recited in claim 1 wherein the geometry of the volumetric object is simplified by reducing one or more attributes of the primitives, including their number, shape, and size.

8. A method as recited in claim 1 wherein the geometry of the volumetric object is transformed from its original, object reference frame into a different reference frame, including a screen space.

9. A method as recited in claim 1 wherein each of the primitives is converted into pixels via a rasterization algorithm and composited into a raster image.

10. A method as recited in claim 1 wherein the steps are performed by a host processor.

11. A method as recited in claim 1 wherein the volumetric object can be mixed with zero-dimentional, one-dimentional or two-dimentional geometric primitives.

12. A computer program products comprising:

a computer usable medium having a computer readable code embodied therein for rendering a volumetric object being described as a tessellation of polyhedra, the volumetric object being defined as a combination of decoupled geometry and appearance attributes to thereby enable changing of the geometry of the volumetric object independently of the appearance of the volumetric object, the computer program comprising:

first computer readable program code devices configured to cause a host processor to tessellate a geometry of the volumetric object into a list of polyhedral primitives;

second computer readable program code devices configured to cause a host processor to simplify the list of polyhedra primitives;

third computer readable program code devices configured to cause a host processor to transform the simplified list of polyhedra primitives into a different reference frame, including a screen space;

fourth computer readable code devices configured to cause a graphic processor to rasterizing the transform list into a raster image; and fifth computer readable program code devices configured to cause a graphic processor and to display the rasterized image.

13. A computer program product as recited in claim 12 wherein the polyhedra are tetrahedra.

14. A computer program product as recited in claim 12 wherein the polyhedra are semi-translucent.

15. A computer program product as recited in claim 12 further comprising sixth computer readable program code devices configured to cause a host processor to subdivide a texture of the volumetric object into one or more overlapping hexahedral bricks.

16. An apparatus for rendering a volumetric object, the volumetric object being described as a tessellation of polyhedra, the volumetric object being defined as a combination of decoupled geometry and appearance attributes to thereby enable changing of the geometry of the volumetric object independently of the appearance of the volumetric object, the apparatus comprising:

the first portion configured to tessellate a geometry of the volumetric object into a list of polyhedral primitives;

a second portion configured to simplify the list of polyhedral primitives;

a third portion configured to transform the simplified list of polyhedral primitives into different reference frame is, including screen space;

a fourth portion configured to rasterize the transformed list into a raster image; and a fifth portion configured to display the rasterized image.

17. An apparatus as recited in claim 16 wherein the polyhedra are tetrahedra.

18. An apparatus as recited in claim 16 wherein the polyhedra are semi-translucent.

19. An apparatus as recited in claim 16 further comprising a sixth portion configured to subdivide a texture of the volumetric object into a series of one or more overlapping hexahedral bricks.

* * * * *